United States Patent [19]

Laugesen et al.

[11] Patent Number: 4,641,247
[45] Date of Patent: Feb. 3, 1987

[54] BIT-SLICED, DUAL-BUS DESIGN OF INTEGRATED CIRCUITS

[75] Inventors: Ronald C. Laugesen, Los Gatos; P. Venkitakrishnan, Sunnyvale, both of Calif.

[73] Assignee: Advanced Micro Devices, Inc., Sunnyvale, Calif.

[21] Appl. No.: 771,387

[22] Filed: Aug. 30, 1985

[51] Int. Cl.$^4$ .............................................. G06F 15/60
[52] U.S. Cl. .................................................. 364/490
[58] Field of Search .......................................... 364/490

[56] References Cited

U.S. PATENT DOCUMENTS 4,583,179 4/1986 Horii et al. ...................... 364/490 X Primary Examiner—Michael L. Gellner
Attorney, Agent, or Firm—Patrick T. King; Kenneth B. Salomon

[57] ABSTRACT

A monolithic integrated circuit chip preferably includes a pair of data busses capable of conducting in parallel the number of signals which can be processed simultaneously by the components on the chip. Signals on the busses are carried in a time-multiplexed manner, each bus having a predetermined number of time slots. Preferably, each component on the chip is connected to one or both of the busses and is assigned a particular time slot for the bus to which it is connected. The resulting chip is of a structured, rather than a custom, design. Accordingly, it can be readily expanded or contracted in the number of signals which can be simultaneously processed. The number of components which can be included on the chip is limited only by the number of time slots available on the bus to which it is connected. By providing two busses, such common circuit elements as two-input adder/subtractors can be readily accommodated by a chip designed according to the instant invention. The bit-slice organization of the chip significantly reduces the design effort of the components connected to a bus, since a one-bit slice is merely replicated for each conductor of the bus. Ease of expansion along this dimension is achieved at virtually no cost.

8 Claims, 4 Drawing Figures

BIT-SLICED, DUAL-BUS DESIGN OF INTEGRATED CIRCUITS

This invention relates to the design of monolithic integrated circuits and, more particularly, to a method and apparatus having a readily-extendible time-division multiplexed bus structure and circuit elements connected to the busses which can be easily expanded so as operate in parallel on more signals.

CROSS-REFERENCE TO RELATED COPENDING APPLICATIONS

Related copending applications of particular interest to the instant application are application Ser. No. 759,622 filed July 26, 1985, on behalf of Alan T. Clark, Hadi Ibrahim & Arthur F. Lange entitled "Digital Subscriber Controller", and assigned to the assignee of the instant application, application Ser. No. 759,624, filed July 26, 1985, on behalf of Alan T. Clark and Arthur F. Lange, entitled "Data Routing Programmable Multiplexer", and assigned to the assignee of the instant application, and application Ser. No. 771,339, filed Aug. 30, 1985, on behalf of P. Venkitakrishnan, Gururaj Singh and Ronald Laugesen, entitled "Streamlined Digital Signal Processor", and assigned to the assignee of the instant application. These three related, co-pending applications are hereby incorporated by reference.

BACKGROUND OF THE INVENTION

The design and fabrication of very large scale integrated (VLSI) and ultra large scale integrated (ULSI) circuits is a labor-intensive and error-prone process. Furthermore, with the increasing complexity and component density of such circuitry on a single chip, the amount of chip area devoted to mere interconnection of components becomes a limiting factor in their design. The design of each chip is viewed as a custom effort and therefore consumes enormous time, even though much of the circuitry on the chip is directly derived from existing chips. Additionally, straightforward expansion of the circuitry, either in terms of the number of signals that can be handled in parallel, or in the number of components included on the chip, requires a difficult custom design effort. This derives from the need to consider race conditions, critical timing paths and hangup states for each modification of the circuit.

Prior art circuits also require additional consideration of how to selectively conduct signals from various components on the chip to and from other components. Typically, a multiplexer element is placed at the input and/or output of particular components to select which signal(s) will be applied to or conducted away from the component. The use of such multiplexer is an example of costly custom design requirements of the prior art.

SUMMARY OF THE INVENTION

A VLSI or ULSI circuit chip according to the present invention preferably includes a pair of data busses capable of conducting in parallel the number of signals which can be processed simultaneously by the components on the chip. Signals on the busses are carries in a time-multiplexed manner, each bus having a predetermined number of time slots. Preferably, each component on the chip is connected to one or both of the busses and is assigned a particular time slot for the bus to which it is connected.

A chip according to the present invention is of a structured, rather than a custom, design. Accordingly, it can be readily expanded or contracted in the number of siganls which can simultaneously processed. The number of components which can be included on the chip is limited only by the number of time slots available on the bus to which it is connected. Since addition of such components involves no custom designed interconnections, but merely extension of the busses, chip die area is conserved while design costs are greatly reduced.

Furthermore, the presence of multiplexers at the inputs and/or outputs of elements connected to the busses is unnecessary because the signals thereon are time-multiplexed. Additionally, the regularity of the bus structure reduces the criticality in timing paths, race conditions and hangup states. Regularity in the multiplexing scheme used for the busses further reduces the design efforts.

By providing two busses, such common circuit elements as two-input adder/subtractors can be readily accommodated by a chip designed according to the instant invention. The dual-bus architecture provides ready transfer of data onto and off the chip, by appropriate choices of bus multiplexed timing, as well as for transfer of data between elements on the chip.

The bit-slice organization of a chip designed according to the invention significantly reduces the design effort of the components connected to a bus, since a one-bit slice is merely replicated for each conductor of the bus. Ease of expansion along this dimension is achieved at virtually no cost.

DETAILED DESCRIPTION OF THE PREFERRED EMBODIMENT

Figure 1:
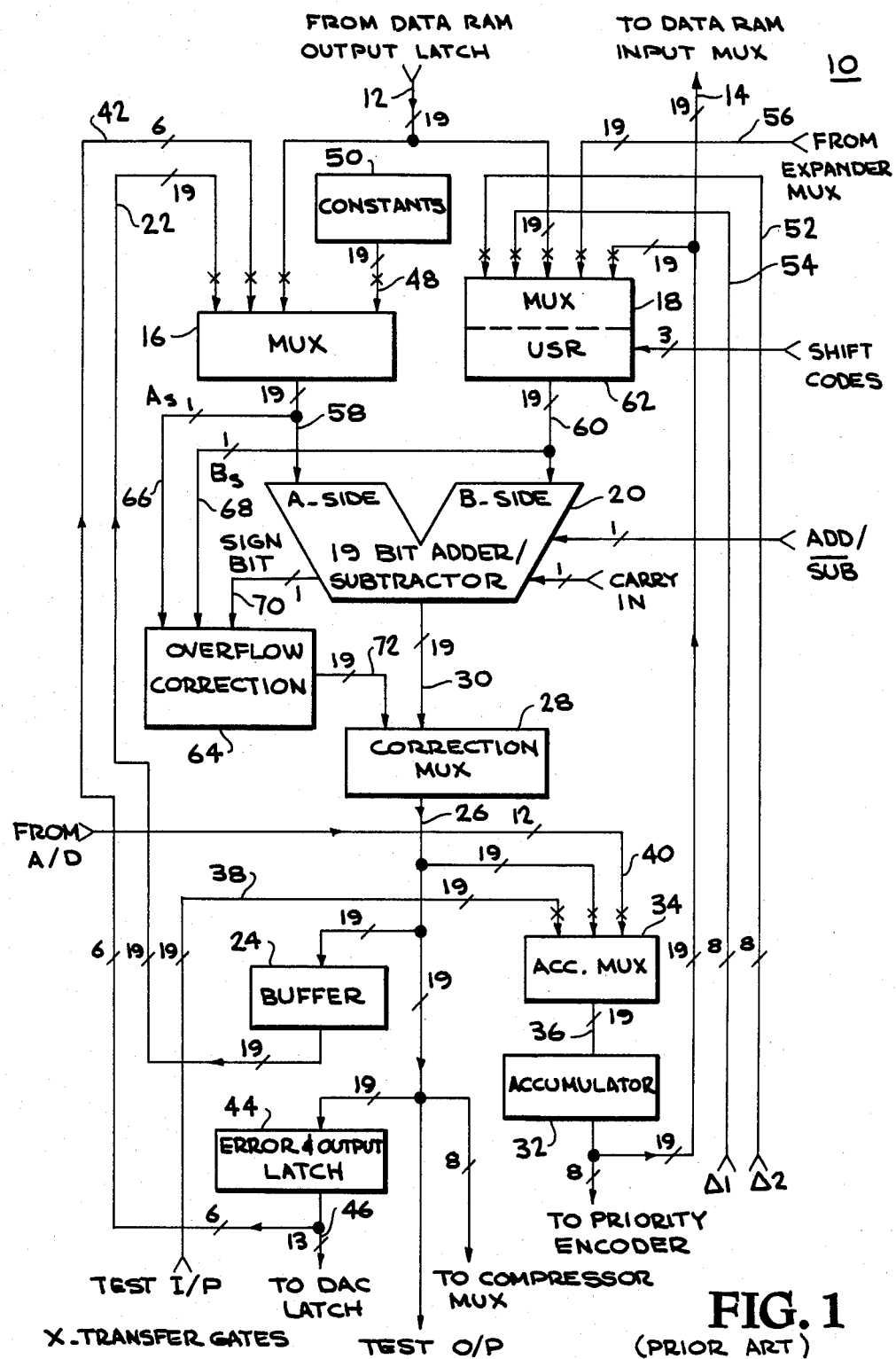
FIG. 1 illustrates an arithmetic-logic unit (ALU) of a prior art design.

To best describe a VLSI chip of a design according to the present invention, reference should be made to FIG. 1 which is a block diagram of a single-chip arithmetic-logic unit (ALU) 10 of prior art design. The ALU 10 is capable of processing nineteen bits of information simultaneously. Accordingly, a number of 19-conductor busses are used to interface ALU 10 with external devices as well as to interconnect on-chip elements. A 19-conductor bus 12 is provided to interface with a random access memory (RAM) output latch to the ALU 10. A separate 19-conductor bus 14 interfaces the RAM input latch with the ALU 10. (Each multi-conductor bus is shown on FIG. 1 with a number in close proximity to a slash through the bus indicating the number of conductors with the bus.)

As shown in FIG. 1, the bus 12 devides and separate branches thereof terminate on a first set of input terminals to a multiplexer 16 and a multiplexer 18 which respectively supply signals to an A- and a B-side input terminals of an 19-bit adder/subtractor 20. A number of other busses terminate on multiplexers 16 and 18; at a second set of input terminals a 19-conductor bus 22 from an output terminal of a buffer 24 which is connected to a bus 26 leading from an output terminal of a correction multiplexer 28. The correction multiplexer 28 is, in turn, connected at a first set of input terminals to a set of output terminals of the 19-bit adder/subtractor 20 via a 19-conductor bus 30. A branch of the 19-conductor bus 14 terminates at a second set of input terminals of the multiplexer 18, the bus 14 leading from a 19-bit accumulator 32 which connected, in turn, to an accumulator multiplexer 34 via a 19-conductor bus 36. The accumulator multiplexer 34 receives at a first set of input terminals the signals from the correction multiplexer 28 via a branch of the 19-conductor bus 26, and at a second set of input terminals external test input signals conducted via a 19-conductor bus 38. At a third set, terminal signals are applied to accumulator multiplexer 34 from an external analog-to-digital (A/D) converter via a 12-conductor bus 40.

A 6-conductor bus 42 terminates on a third set of input terminals to multiplexer 16 leading from an error and output latch 44 which is, in turn, connected to a branch of 19-conductor bus 26. A thirteen-conductor bus 46 conducts the remaining thirteen signals generated by the error and output latch 44 to an external digital-to-analog (D/A) converter. Multiplexer 16 also receives at a fourth set of input terminals via a 19-conductor bus 48, signals from a constant register 50.

Multiplexer 18 receives at a third and fourth set of input terminals, via eight-conductor busses 52 and 54, respectively, signals from external registers representing tone generation parameters delta 1 and delta 2, respectively. Multiplexer 18 receives at a fifth set of input terminals signals from an external source via a 19-conductor bus 56.

A 19-conductor bus 58 conducts signals from a set of output terminals of multiplexer 16 to the A-side input terminals of the 19-bit adder/subtractor 20. A 19-conductor bus 60 conducts signals to the B-side input terminals of adder/substractor 20 from a set of output terminals of a shift register 62, which is in turn connected to the output terminals of multiplexer 18. An overflow correction element 64 receives the signals from the most-significant bit position of the signals on busses 58 and 60 as well as the signal generated by adder/subtractor 20 representing the sign of the results of adding or subtracting the operands applied at the A- and B-side input terminals, via signal lines 66, 68 and 70, respectively. A 19-conductor bus 72 conducts correction signals generated by overflow correction element 64 to a second set of input terminals of correction multiplexer 28.

A detailed description of the structure and operation of an ALU functionally equivalent to that of ALU 10 of FIG. 1 can be had by reference to related, copending application U.S. Ser. No. 771,339, entitled "Streamlined Digital Signal Processor", filed Aug. 30, 1985 on behalf of P. Vekitakrishnan, Gururaj Singh and Ronald Laugesen and assigned to the assignee of the present application. This description is hereby incorporated by reference.

As illustrated in FIG. 1, the ALU 10 of prior art design requires a large number of custom-designed data busses which occupy a substantial die area of the integrated circuit chip containing the ALU 10. Expansion of the ALU 10 either to process a larger number of bits simultaneously, or to add additional circuit elements to the chip, would entail a great deal of redesign effort due to the irregular architecture of the ALU 10.

Of particular concern is the presence of multiplexers 16 and 18 which require generation of complex control signals and are an inherent bottleneck to the flow of data to be processed by ALU 10. Expansion of the chip to include additional on-chip elements for the ALU 10 would require additional busses originating on these elements and terminating on these multiplexers. A large amount of die area could be occupied merely by the busses interconnecting these elements and a considerable amount of design effort would be directed at the generation of multiplexer control signals to accommodate these additional busses. Such custom-design requirements are inherent in the prior art architecture represented by the ALU 10 shown in FIG. 1.

Figure 2A:
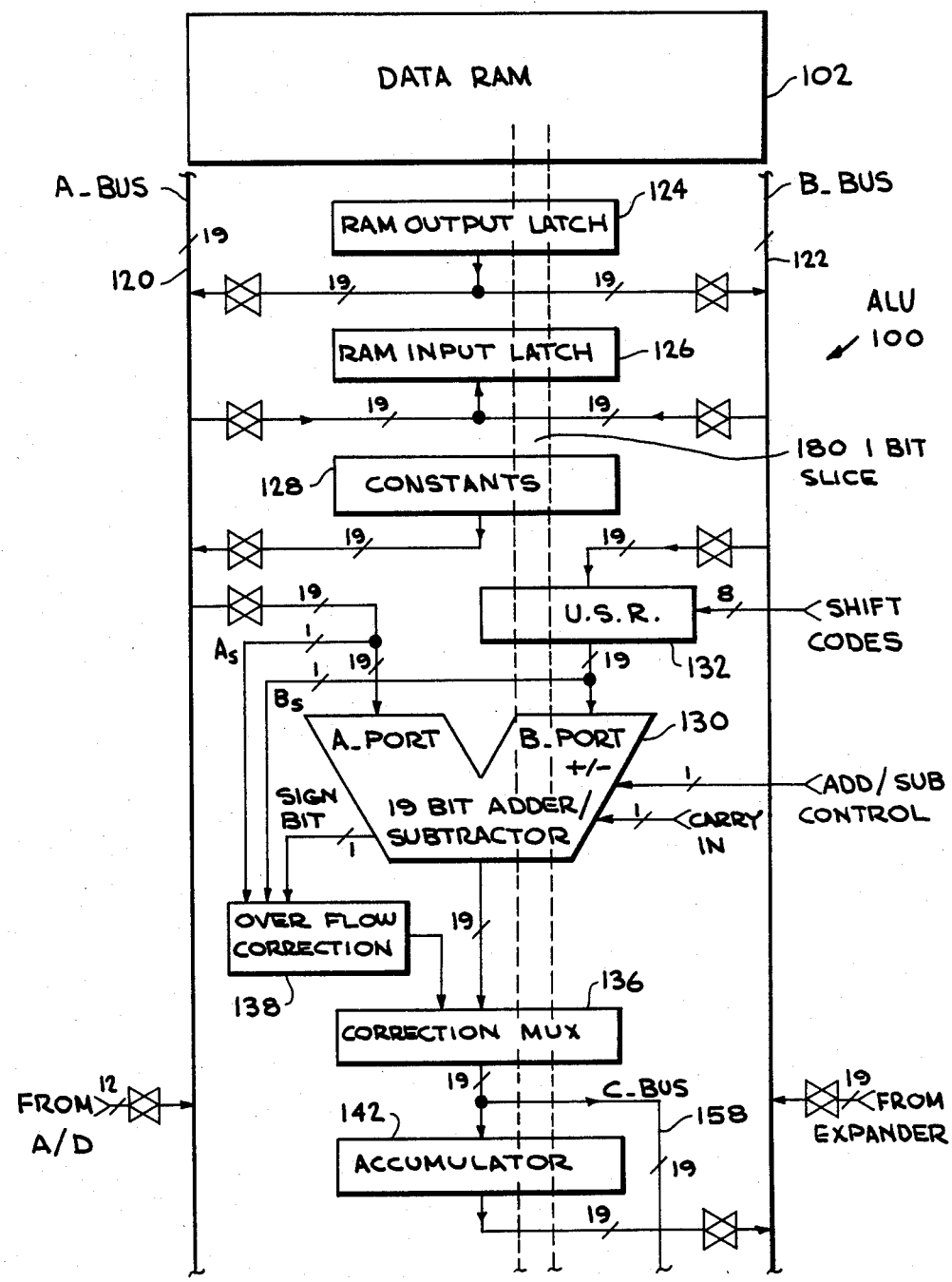
FIGS. 2A and 2B illustrate a dual-bus ALU of bit-sliced design of the instant invention.
Figure 2B:
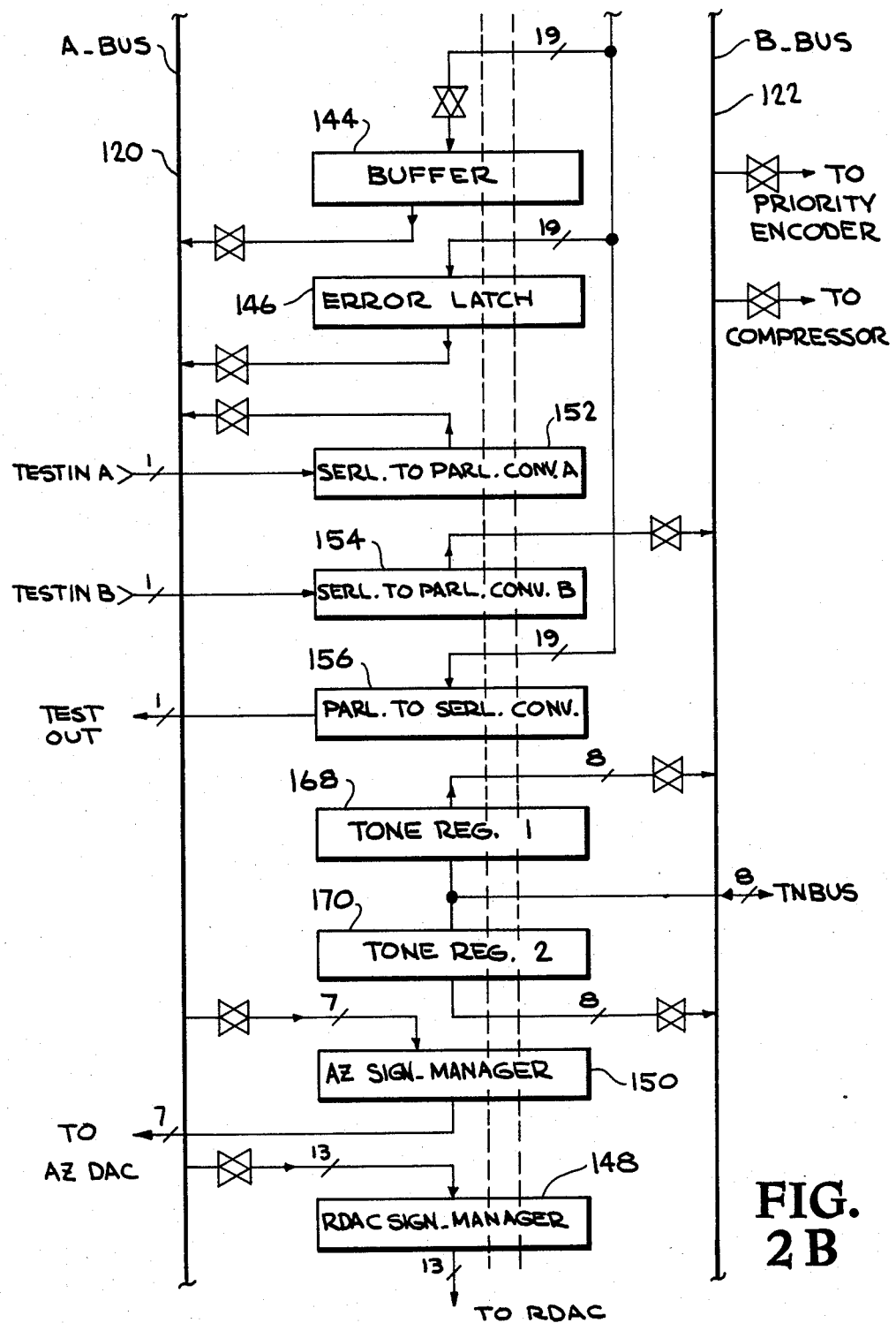

An ALU 100, of design according to the instant invention, is shown in FIGS. 2A and 2B ALU 100 is functionally equivalent to that of ALU 10 of prior art design and accordingly its structure and operation is described in the related, copending application referred to above. However, ALU 100 is of a dual-bus, bit-sliced modular design which eliminates many of the limiations of the ALU 10 of FIG. 1 of prior art design. The dual busses carry, bidirectionally, signals which are time-division multiplexed.

With reference to FIG. 2A, the ALU 100 includes a data RAM 102, and a pair of bidirectional 19-conductor busses; an A bus 120 and a B bus 122. The data RAM 102 is connected to the A and B busses via an output latch 124 and via an input latch 126. A register 128 which stores numerical constants is connected to the A bus 120. A 19-bit adder/subtractor 130 has an A-side input connected to A bus 120 and a B-side input connected to B bus 122 via a shift register 132.

Adder/subtractor 130 receives a carry-in (C_IN) signal and an add/subtract (+/−) signal generated by a shift multiplexer, not shown. Shift multiplexer also generates in parallel a 3-bit shift control signal which is received by the shift register 132. The resulting sum or difference of the 19-bit binary numbers corresponding to the signals received at the A and B input ports to adder/subtractor 130 is generated therein and conducted to a correction multiplexer 136. An overflow detector (O/F DET) 138 also receives the signals corresponding to the binary numbers received by the adder/subtractor 130 as well as a carry-out signals generated adder/subtractor 130 and produces an overflow signal which is received by correction multiplexer 136.

The corrected result of adding or subtracting the values of the A and B inputs to adder/subtractor 130 is generated by the multiplexer 136 and received by an accumulator 142. The contents of accumulator 142 is conducted to the B bus 122. With reference now to FIG. 2 corrected result generated by multiplexer 136 is also conducted via a buffer 144 to the A bus 120 and via a an error latch 146 to the A bus. A D/A converter is connected to the ALU 100 via A bus 120 and a RDAC sign magnitude generator 148 and an autozero (AZ) DAC generator 150. An A/D converter is connected to the ALU 100 via A bus 120. A set of serial shadow registers (SSR) 152, 154 and 156 permit test sequences to be serially applied to the A-bus 120, the B-bus 122, and received in parallel from the correction multiplexer 136, respectively. Accordingly, the SSR 152 is a serial to parallel converter connected to A-bus 120 and to a source of test signals (TESTIN_A). SSR 154 is a serial to parallel converter connected to B-bus 122 and to a source of test signals (TESTIN_B). SSr 156 is a parallel to serial converter connected to a 19-conductor C-bus 158 and which generates therefrom serial test signals (TESTOUT).

Control signals are generated by a control, not shown on FIGS. 2A or 2B in accordance with the contents of mode registers not shown on FIGS. 2A or 2B as well as the clock and frame synchronization signals received from an oscillator which are received by the various elements of the ALU 100 shown in FIGS. 2A or 2B. However, many of the lines conducting these signals are not explicitly shown in FIGS. 2A or 2B nor are all these signals described herein as generally the nature and distribution of such signals are well-known to those skilled in the art.

A priority encoder, not shown, connected to B bus 122 generates in parallel on a 3-bit signal line signals also received by shift multiplexer. A compression multiplexer now shown is connected to the priority encoder and to the B bus 122 and generates a time-division multiplexed signal therefrom which is received by a PCM output register, not shown. A PCM input register, not shown, is connected to an expander multiplexer, not shown, which generates signals in parallel on a 19-bit conductor signals to the B bus 122.

A tone register 1 168 and a tone register 2 170, receive user-selected tone coefficient signals via a tone bus (TNBUS) and these signals are conducted therefrom to the B bus 122. During a tone generation operation, the contents of tone register 1 and 2 are conducted via the B bus 122 and the shift register 132 to the B input port of the adder/subtractor 130 under control of the 3-bit parallel signals generated by a shift multiplexer, not shown, and received by the shift register 132.

A so-called COEFF variable which will be used in the description of the operation of the ALU 100 shown in FIGS. 2A and 2B reflects the number of right shifts to be performed by shift register 132 as well as the state of the add/subtract signal received by adder/subtractor 130. As such, the COEFF variable represents the 4-bit parallel signals generated by shift multiplexer 134 of which a 3-bit parallel portion is received by the shift register 132 which determines the number of right shifts to be performed thereby and a 1-bit portion is received by the adder/subtractor 130 which determines whether an addition or a subtraction is to be performed thereby.

At the A input port, the adder/subtractor 130 can select one of the following as a source: the buffer 144, the data RAM output latch 124, or the constants register 128. Selection is performed by a multiplexer internal to the adder/subtractor 130 which is responsive to control sigals generated by control 112. Similarly, at the B input port, the adder/subtractor 130 can select one of the following as a source: the accumulator 142, the data RAM output latch 124, the expander multiplexer, the tone register 1 168, the tone register 2 170, or the constant "0".

The contents of a location within data RAM 102 selected by an address generated by control, can be read to the data RAM output latch 124. The contents of a selected location within data RAM 102 can be written from the following sources: accumulator 142, buffer 144, the A/D converter, data RAM output latch 124, or the constant "0".

Figure 3:
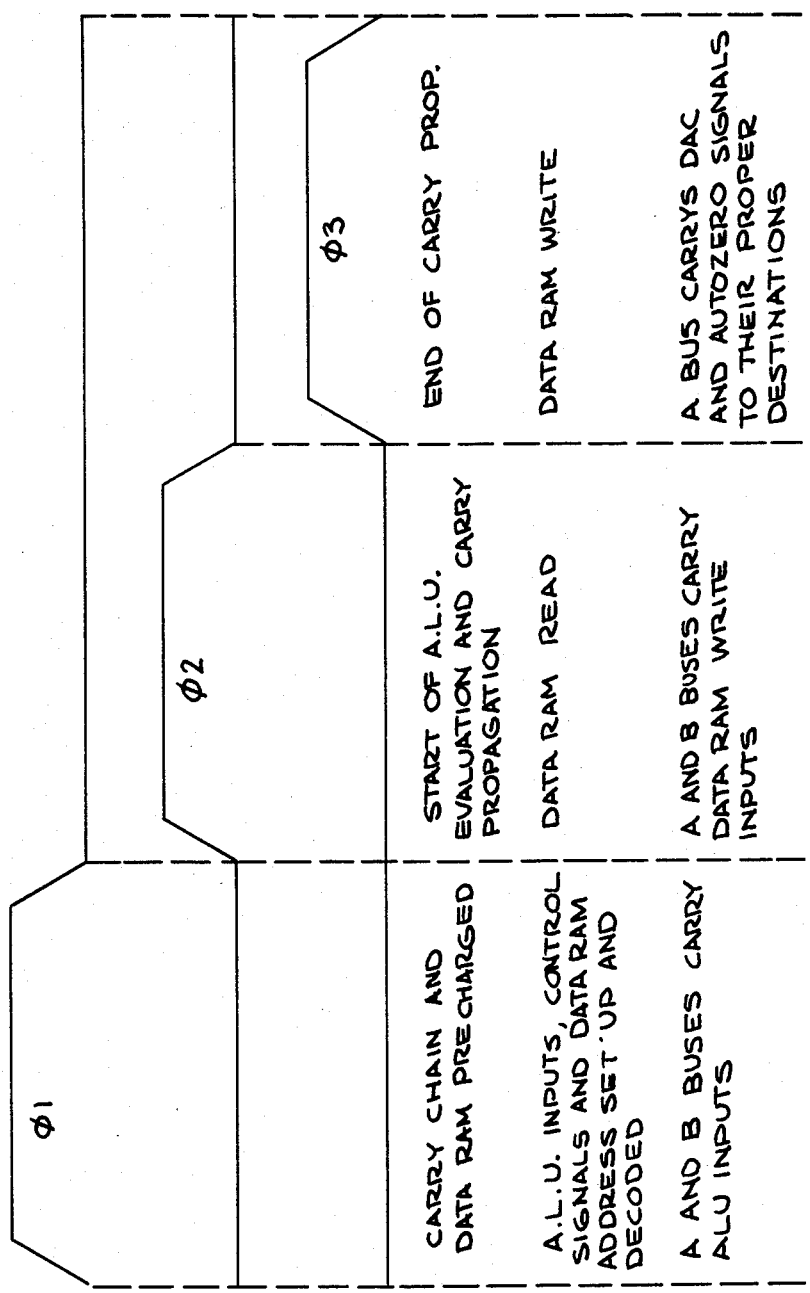
FIG. 3 is a timing diagram of the ALU of the instant design.

With reference to FIG. 3, during the first phase of the 3-phase clock signal generated by an oscillator, the contents of one of the following sources is placed onto the A bus 120: data RAM output latch 124, the constant "0", or the buffer 144. During the second phase of the 3-phase clock, the contents of one of the following sources is placed onto the A bus 120: the constant "0", the A/D converter, or the buffer 144. During the first phase of the 3-phase clock, the contents of one of the following sources is placed onto the B bus 122: the constants register 128, the data RAM output latch 124, the expander multiplexer, or the accumulator 142; and during the second phase: the accumulator 142, or the data RAM output latch 124. The above-referenced operations are controlled by the control during execution of a series of microcode instructions. These instructions are stored within a memory section of the control, not shown.

The control executes a series of the instructions described above each of which causes one or more of the following operations to take place:

ACC, <BUF>=COEFF*ADATA+BDATA
<R>XXX and

W(A, B, L, D, O)>XXX.

In the first operation concerning the accumulator (ACC) 142 and, optionally, the buffer (BUF) 144, ADATA can be the contents of the accumulator 142, the data RAM output latch 124, the expander multiplexer, the tone registers 1 and 2 168 and 170, or the constant "0". The source of COEFF can be the control, the coefficient RAM, the expander multiplexer, the priority encoder, the tone registers 1 and 2 168 and 170, or the accumulator 142. BDATA can be the contents of the buffer 144, the data RAM output latch 124, or the constants register 128. The buffer register 144 can be optionally selected, as well as the accumulator register 142, to store the results of the operation.

The second operation <R> is an optional storage of the contents of the data RAM 102 at location XXX into data RAM output latch 124, and the third operation concerns an optional storage into the data RAM 102 at location XXX from one of the following: the accumulator (A) 142, the buffer (B) 144, the A/D converter (D) 600, the data RAM output latch (L) 124, or the constant "0".

The ALU 100 design illustrated in FIGS. 2A and 2B incorporates the dual busses 120 and 122 which extend throughout that portion of the die area of the integrated circuit chip containing the ALU. In this maner, each element illustrated in FIGS. 2A and 2B other than the data RAM 102 can be readily connected to one or both of the bidirectional data busses 120 and 122 with only a minimal amount of die area used for the interconnection. Only a limited number of custom designed signal lines are used in the design of the instant invention. Furthermore, the busses can be readily extended to allow additional elements to be added to the ALU 100. The number of such elements limited more by the number of time slots available to multiplex signals on the busses 120 and 122 than the die area. An additional benefit of the presence of the bidirectional time-division multiplexed busses 120 and 122 of the design of the present invention is the absence of custom-designed multiplexers 16 and 18 (FIG. 1) used in the prior art to interconnect the various elements to such components as the adder/subtractor. The difficulty of adding additional circuit elements which result from the presence of such multiplexers are avoided by the dual-bus design of the instant invention.

The dual bus design also facilitates transfer of data into and out of the ALU 100 by allowing one bus to be conducting data to or from a particular element via the bus connected to the terminals of that element while conducting to or from another, or the same, element via the other bus connected to the terminals of that element. For instance, buffer 144 is connected at its output terminals to A bus 120 and accumulator 142 is connected at its output terminals to B bus 122 which permits data to be transferred out of adder/substractor 130 at the same time that accumulated data is transferred out of adder/substractor 130 via B buss 122. Or signals from the external A/D converter can be routed to the A-port of adder/substractor 130 via the A bus 120 while signals from accumulator 142 are conducted to the priority encoder via the B bus 122.

Illustrating another aspect of the design methodology of the instant invention, a one bit-slice module 180 is outlined in dashed lines in FIGS. 2A and 2B. The elements of the ALU 100 which are shown as having a one bit portion enclosed by the dashed lines consist of an element processing a total of nineteen bits in parallel. Each one bit slice thereof is replicated eighteen times in essentially unchanged form. The 19-conductor A bus 120 and/or B bus 122 each have a conductor which connects to the one-bit portion of each element shown as connected to the bus 120 and/or 122 in FIGS. 2A and 2B. For instance, the constants register 128 is a 19-bit register with each bit position connected at an output terminal to a corresponding conductor a A bus 120. The RAM input latch 126 is a 19-bit latch with each bit position connected at an input terminal to the corresponding conductors of both A and B busses 120 and 122.

In this manner, each 19-bit element shown in FIGS. 2A and 2B connected to either the A or B bus 120 and 122 has a bit position connected to the corresponding conductor of the A or B bus. Thus data RAM 102, RAM output latch 124, RAM input latch 126, constants register 128, shifter 132, A input port of adder/substractor 130, accumulator 142, buffer 144, error latch 146, serial shadow registers 152, 154 and 156, tone registers 168 and 170 and sign-magnitude generators 150 and 148. In this manner, the design of the overall ALU 100 is structured along the busses and the design of the individual elements connected to the busses is modularized bringing with it a minimal amount of custom design effort both in the initial design of the ALU 100 as well as ease of expandability along either the bus dimension or the element dimension. Further benefits include reduction of circuit design errors and ease of correction of those errors which may occur due to the regularity and replicability of the design methodology of the instant invention. Additional advantages accrue from the ease of timing considerations owing to the regularization of data transfers provided by the dual-bus structure of the instant invention.

We claim:

1. A portion of a monolithic integrated circuit chip performing operations in parallel on a plurality of signals, comprising:
    at least two plural-conductor time-division multiplexed bidirectional busses, each having a conductor carrying one of said plurality of signals operated on by said chip portion; and
    a plurality of circuit elements each performing parallel operations on a predetermined one of said plurality of signals;
    wherein each said circuit element is assigned a predetermined time-division slot of at least one of said busses and each said circuit element comprises a plurality of subelements each connected to a predetermined one of said conductors of said at least one bus.

2. A monolithic integrated circuit chip portion according to claim 1 wherein predetermined ones of said subelements of a circuit element are replicated.

3. A monolithic integrated circuit chip portion according to claim 1 responsive to a plural-phase clock signal wherein predetermined ones of said circuit elements are sources for a predetermined one of said busses during said predetermined time-division slots assigned to said circuit elements, and predetermined ones of said circuit elements are destinations for a predetermined one of said busses during said predetermined time-division slots assigned to said circuit elements.

4. A method of designing a portion of a monolithic integrated circuit chip performing operations in parallel on a plurality of signals, comprising the steps of:
    (a) providing at least two plural-conductor time-division multiplexed bidirectional busses, each having a conductor carrying one of said plurality of signals operated on by said chip portion;
    (b) including a plurality of circuit elements each performing parallel operations on a predetermined one of said plurality of signals;
    (c) assigning each said circuit element a time-division slot on at least one of said busses;
    (d) forming each said circuit element of a plurality of subelements; and
    (e) connecting each said subelement of said circuit element to a predetermined one of said conductors of said at least one bus.

5. A monolithic integrated circuit chip portion design method according to claim 4 wherein step (d) further calls for forming predetermined ones of said subelements of a circuit element by replication.

6. A monolithic integrated circuit chip portion design method according to claim 4 wherein said chip portion is responsive to a plural-phase clock signal, further including the steps of:
    (f) assigning predetermined ones of said circuit elements as sources for a predetermined one of said busses during said predetermined time-division slots assigned to said circuit elements; and
    (g) assigning predetermined ones of said circuit elements as destinations for a predetermined one of said busses during said predetermined time-division slots assigned to said circuit elements.

7. A monolithic integrated circuit chip portion design method according to claim 4, further providing a method of adding circuit elements included in said chip portion, comprising the further steps of:
    (h) extending the length of said busses provided at step (a);
    (i) assigning each said added circuit element a time-division slot on at least one of said extended busses;
    (j) forming each said added circuit element of a plurality of subelements; and
    (k) connecting each said subelement of said added circuit element to a predetermined one of said conductors of said at least one extended bus.

8. A monolithic integrated circuit chip portion design method according to claim 4, further providing a method of increasing the number of said plurality of signals which can be operated on in parallel by said chip, comprising the further steps of:

(l) adding a predetermined number of conductors to said busses provided at step (a);
(m) adding subelements forming each said circuit element in the amount of said conductors added at step (l); and
(n) connecting each said subelement added to said circuit element at step (m) to a predetermined one of said conductors added to said busses at step (l) of said at least one bus.

* * * * *